Oct. 7, 1958  S. A. M. CAILLÉRE ET AL  2,855,274
TREATMENTS OF SILICO-MAGNESIA MINERALS
AND IN FURNACES FOR CARRYING
OUT SUCH TREATMENTS
Filed Aug. 30, 1954

INVENTORS
SIMONNE ANNE MARIE CAILLERE,
MARC FOEX,
BY
Robert B Pearson
ATTORNEY

2,855,274

TREATMENTS OF SILICO-MAGNESIA MINERALS AND IN FURNACES FOR CARRYING OUT SUCH TREATMENTS

Simonne Anne Marie Caillère and Marc Foex, Paris, France, assignors to Centre Nationale de la Recherche Scientifique, Paris, France, a French society Application August 30, 1954, Serial No. 452,852

Claims priority, application France September 9, 1953

5 Claims. (Cl. 23—110)

The present invention is concerned with the treatment of silico-magnesia minerals to convert them into forsterite ($SiO_2.2MgO$) or into products having a high content of forsterite, for use as refractory materials (melting point of forsterite about 1900° C.). The invention is concerned with the treatment of silico-magnesia minerals containing a greater proportion of silica than forsterite; this is generally the case with the naturally occurring minerals. In particular, minerals having, as their base, the following rocks or minerals (here mentioned by way of indication and not by way of limitation) may be treated: drysolites (olivines), pyroxenes (enstatite), peridotites (dunit, harzburgite, wherlite, lherzolite), pyroxenites, pyroxenolites, serpentine minerals and serpentine rocks, steatites, talc and magnesia basalts.

These minerals or rocks contain, in addition to silica and magnesia, larger or smaller quantities of iron oxide and other minor constituents, particularly alumina. Certain of the foregoing minerals are abundant in nature, but are only utilized to a relatively small extent. In particular, their employment for the preparation of refractory materials is considerably limited owing to the presence of iron oxide and of large quantities of silica, which lower the temperature at which the refractory material would break up under load. On the one hand, silica in excess of that required for forsterite gives enstatite ($SiO_2MgO$) and a eutectic with the low melting-point of 1560° C.; on the other hand, the ferric oxide which is formed in an oxidising medium is only slightly soluble in the solid state in forsterite and gives a fusible phase.

In order to improve the refractory qualities of these products, the prior processes generally treat them at a high temperature with magnesia or products rich in magnesia, so as to obtain refractories which are richer in forsterite. These prior processes have the disadvantage, on the one hand, of using rather expensive products and, on the other hand, of generally not eliminating the iron which is often present in large quantities.

An object of the present invention is to obtain, in a single thermal treatment and without any addition of magnesia, a product which is very rich in forsterite.

The process of the present invention essentially comprises the silico-magnesia mineral, at a high temperature, with a carbonaceous product, i. e. carbon or a solid, liquid or gaseous product containing carbon, in such a manner as to reduce the iron oxide present to the metallic state and, on the other hand, to reduce a part of the silica to the volatile silicon monoxide, or to silicon, and thus to obtain a product which is rich in forsterite. The silica in excess of that required for forsterite is, as a matter of fact, easily reduced by the carbon and it is therefore possible in practice, to eliminate it without loss of very large quantities of magnesia.

Part of the silica is apparently volatilized as the monoxide, SiO. Another part is eliminated by the formation of ferro-silicon or a composition which is often near that of the silicide, $Fe_3Si_2$, and which contain only small quantities of magnesium and of carbon. The elimination of silica by the formation of iron silicide appears to proceed more readily than the elimination by means of the volatilization of the monoxide, and the presence of iron is practically indispensable in order to carry out the process of this invention with a good yield and limited losses of magnesia. It may, therefore, be advantageous in certain cases to add a small quantity of iron oxide or iron to the mineral in order to facilitate the elimination of silica in excess of that required for forsterite.

The temperature should be sufficiently high to enable the foregoing double reduction to take place rapidly but should not be excessively high as otherwise a great reduction of the forsterite itself by the carbon may take place. By way of indication, but not by limitation, temperatures of the order of 1800 to 1900° C. may be employed.

The present invention may be carried into effect using known furnaces, and furnaces heated by concentrated radiation of solar, electrical or other origin or by graphite resistances may preferably be employed.

It may also be advantageous to employ a furnace which provides a large apparent surface for the mineral being treated, to promote the ready volatilization of the silica in excess of that required for forsterite, thereby to obtain a more homogeneous product.

A preferred embodiment of the present invention will be hereinafter described with reference to the accompanying drawing, given merely by way of example, and in which.

Figure 1:
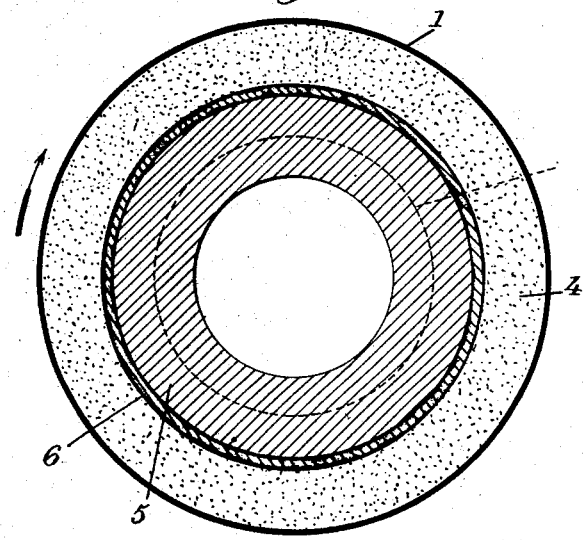
Fig. 1 is a cross section on the line I—I of Fig. 2.
Figure 2:
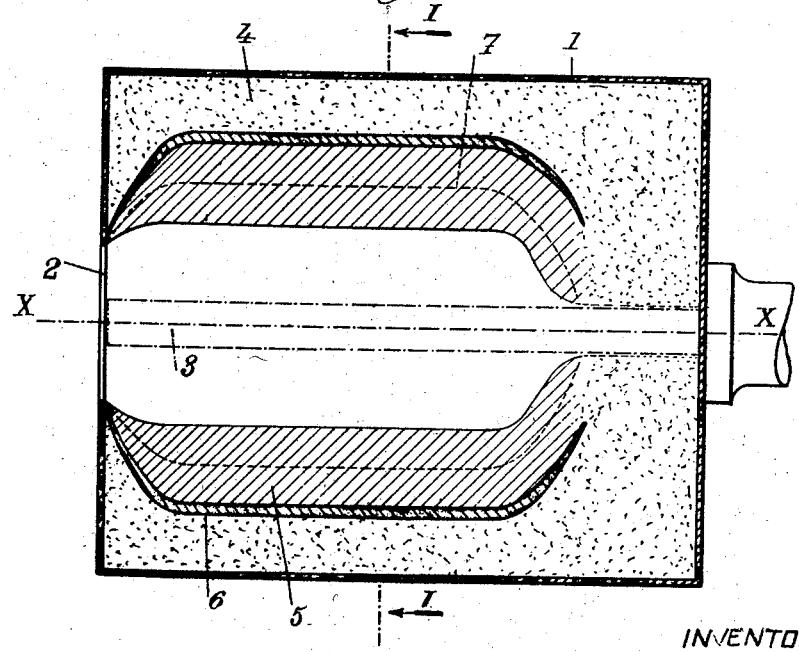
Fig. 2 is an axial section of a furnace according to the invention.

By way of non-limitative indication, the process of the present invention may be carried out in a cylindrical metallic vessel 1 rotated about its axis X—X at a speed sufficient for the centrifugal force to cause the mineral being treated to adhere to the walls of the vessel. The mineral is heated either by means of concentrated radiation (of solar, electrical, or other origin) which passes into the cylindrer through an orifice 2 arranged at one of its ends and on its axis, or by means of a heating resistance 3 (in particular a graphite resistance) placed along the axis of the cylinder. The treatment mixture which consists of, for example, a mixture of mineral and of charcoal is brought rapidly to its melting temperature and reacted; the reaction progresses from the inside of the furnace to the outside; the outer part of the mixture 4 being adjacent to the walls, which are preferably cooled, serves as a heat insulator, thereby to reduce or avoid contamination of the product 5 by an extraneous support. The iron, which is reduced by the carbon, collects as shown in 6 in the form of globules containing silicon, whilst the silicon in excess of that required for the formation of forsterite is rapidly eliminated. After cooling, the product is separated from the fritted underlying part; it is crushed and the metallic globules of ferro-silicon or of reduced metal are separated by magnetic sorting.

In general the process of the present invention enables a product extremely rich in forsterite to be obtained and which can conveniently be separated from the metallic phase by, for example, crushing followed by separation by means of agitating tables, levigation, flotation, by magnetic sorting or by means of chemical separation (for example, by washing with a suitable reagent).

The forsterite obtained, whether molten or fritted, is of granular structure, the grains thereof being colourless and more or less fine; only a single phase is visible under the microscope and any coloured phase rich in iron is absent.

The product obtained is practically free from iron and does not contain more than a certain quantity of aluminium which is necessarily limited, especially if certain minerals which are extremely low in alumina are employed.

Thus, a serpentine of the total composition $SiO_2$ 39.2%; $Fe_2O_3$ 5.8%; FeO 0.9%; $Al_2O_3$ 1.8%; MgO 37.8% (plus a certain quantity of water) which was treated with 20% of charcoal in the centrifugal furnace hereinbefore described, gave a product of the total composition $SiO_2$ 41.4%; MgO 55.9%; $Al_2O_3$ 2.7% (molecular ratio $MgO/SiO_2=2.01$) which is near to that of the composition of forsterite namely $SiO_2$ 42.7%; MgO 57.3% (molecular ratio $MgO/SiO_2=2.00$).

However, the elimination of silica is often accompanied by losses of magnesia. If the mass of the product that is brought to a high temperature contains excess of carbon, the magnesium formed by the reduction of the magnesia content of the mineral distils towards the cold parts of the furnace and the total magnesia content of the product may be reduced. This loss may not be negligible and it may then in practice be extremely difficult to obtain a product which is as rich in magnesia as is forsterite, even by aiding the elimination of the silica by the addition of iron (formation of ferro-silicide in a reducing medium).

This invention also provides, according to a further aspect, a modified process for overcoming this difficulty.

In this modification there is present in the furnace in which the process is carried out, an oxidising atmosphere (air, oxygen, etc.), or oxygen-containing substances which can be reduced by magnesium. It is therefore necessary to set up in the furnace, in the vicinity of the reducing and carbonising zone which is necessary to eliminate the iron and a part of the silica, an oxidising zone to enable the magnesium corresponding to the quantity of magnesia reduced in the carbonising zone to be oxidised to magnesia, the latter then combining with the silica produced to form forsterite.

Under these conditions, since the quantity of magnesium which distils off to the cold parts of the apparatus is brought back into the mass, the losses of magnesia are small and the final product has a composition which is practically identical with that of forsterite ($SiO_2.2MgO$).

It should be noted that the volatile monoxide SiO oxidises less easily than magnesium, the silica which is formed not being combined chemically with a product having, in general, an excess of this oxide in relation to forsterite.

Owing to the great affinity of magnesium for oxygen, many oxidising substances other than air may be used, for example carbon dioxide, which is easily reduced by carbon, alone or mixed with carbon monoxide or other gases.

Among the furnaces which are suitable for carrying out this modified process, there may advantageously be used electric furnaces comprising one or more graphite radiators, in which an atmosphere consisting of carbon monoxide and a small quantity of carbon dioxide is easily produced.

In the case in which the oxygen is provided by air, the centrifugal solar furnaces are especially to be recommended for such furnaces operate in the open air. The central initially carbonizing zone oxides rapidly, whilst the reduction by the carbon or the carbonaceous products takes place in the peripheral parts of the furnace which are at the greatest distance from the inlet opening for the radiation, through which the gaseous exchange with the atmosphere takes place. The oxidising action extends progressively at the expense of the carbonising zone, at the rate at which the reaction takes place. The mass of product obtained in the oxidising zone has a composition which is very near to that of forsterite, is substantially free from iron and generally does not contain as impurities more than small quantities of alumina (found in the mineral).

The limits between the oxidising zone and carbonizing zones in the furnace are indicated by a stippled line 7.

By way of indication, in a solar centrifugal furnace, the high temperature treatment of a mineral of the total composition: $SiO_2$ 37.8%; MgO 36.9%; $Al_2O_3$ 2.8%; $Fe_2O_3$ 8.2%; CaO 1.2%; $H_2O$ 13.1% in the presence of 10% charcoal gave a final product having a total composition: $SiO_2$ 42%; MgO 54.5%; $Al_2O_3$ 2%; FeO 0.5%; CaO 1%, the loss of magnesia being less than 5% of the initial quantity present.

In either case, the product obtained, which is substantially pure forsterite, constitutes one of the most advantageous raw materials for the preparation of refractory bricks of high quality, or for any other application of this kind. The melting point of the refractory articles thus obtained is near that of forsterite, that is to say near 1900° C., the point of breaking down under load being very high owing to the elimination of the fusible ferruginous products and of the excess silica which forms, with the forsterite, a eutectic of low melting point.

What we claim is:

1. A method for the treatment of a silica and forsterite mineral containing a greater proportion of silica than forsterite which comprises mixing said mineral with a carbonaceous product capable of reducing metallic oxides, placing the mixture thus obtained in a rotary furnace having a central opening and rotating said furnace whereby said mixture is forced against the inner wall of said furnace while leaving an empty zone in said furnace about the axis of rotation thereof, said empty zone containing said central opening of the furnace and said central opening being fed with at least one gaseous oxygen-containing substance reducible by magnesium to produce an oxidizing atmosphere in said empty zone and heating said mixture from the empty zone of said furnace at a temperature sufficient to reduce the silica and iron oxide present in said material, the oxidizing atmosphere in said zone reoxidizing the amounts of magnesium produced by the reduction of magnesia from said mineral by said carbonaceous product.

2. A method according to claim 1 in which said heating is conducted at a temperature ranging from 1800 to 1900° C.

3. A method according to claim 1 in which a small quantity of a substance selected from the group consisting of iron and iron oxide is added to the silico-magnesia mineral to facilitate the elimination of silica in excess of that required for forsterite.

4. A method according to claim 1 in which the carbonaceous product is charcoal.

5. A method according to claim 1 in which said oxidizing atmosphere consists of air.

References Cited in the file of this patent

UNITED STATES PATENTS

| | | |
|---|---|---|
| 711,319 | Jacobs | Oct. 14, 1902 |
| 1,083,287 | Lindbald | Jan. 6, 1914 |
| 1,191,804 | Lidholm | July 18, 1916 |
| 1,284,488 | Steward | Nov. 12, 1918 |
| 1,904,548 | Schultze | Apr. 18, 1933 |
| 2,142,943 | Kerschbaum | Jan. 3, 1939 |
| 2,373,749 | Elkington et al. | Apr. 17, 1945 |
| 2,384,563 | Roseman et al. | Sept. 11, 1945 |
| 2,418,026 | Goldschmidt | Mar. 25, 1947 |
| 2,590,566 | Osborn | Mar. 25, 1952 |